United States Patent [19]

Berry et al.

[11] Patent Number: 5,774,063
[45] Date of Patent: Jun. 30, 1998

[54] METHOD AND APPARATUS FOR SOFTWARE BASED WIRELESS REMOTE CONTROL OF ELECTRONIC DEVICES

[75] Inventors: Richard Edmond Berry; Jimmie Darius Edrington, both of Georgetown, Tex.

[73] Assignee: International Business Machines Corporation, Armonk, N.Y.

[21] Appl. No.: 572,473

[22] Filed: Dec. 14, 1995

[51] Int. Cl.[6] .................................................. G06F 1/00
[52] U.S. Cl. ........................... 340/825.69; 340/825.72; 340/825.71; 340/825.22; 340/825.24; 348/163; 348/164; 348/734; 341/176; 359/142; 359/145; 359/148
[58] Field of Search .................. 340/825.69, 825.71, 340/825.72, 825.22, 825.24, 825.25; 348/164, 163, 734; 341/176; 359/142, 145, 148

[56] References Cited

U.S. PATENT DOCUMENTS 5,086,385  2/1992  Launey et al. ...................... 364/188
5,414,761  5/1995  Darbee ................................ 379/102
5,457,478  10/1995  Frank ................................. 345/158
5,475,835  12/1995  Hickey .............................. 395/600

*Primary Examiner*—Michael Horabik
*Assistant Examiner*—Yonel Beaulieu
*Attorney, Agent, or Firm*—Jenkins & Gilchrist; Mark S. Walker

[57] ABSTRACT

A method and apparatus for remote control of electronic devices includes one or more processing units, a memory system, one or more I/O controllers, controlling various input/output devices such as a keyboard, a mouse, a display device, communications adapters and the like, a bus which connects the processing units, the memory system, and the I/O controllers, one or more transducers adapted to convert electronic signals to wireless communications signals and one or more application programs executable by the processor units for controlling generation and transmission of wireless communications signals for remote control of one or more electronic devices. A typical application is the control of transmission of infrared signals to remotely control consumer electronics equipment.

14 Claims, 3 Drawing Sheets

METHOD AND APPARATUS FOR SOFTWARE BASED WIRELESS REMOTE CONTROL OF ELECTRONIC DEVICES

FIELD OF THE INVENTION

The present invention relates to method and apparatus for remote control of electronic devices, and more particularly to method and apparatus for wireless remote control of electronic devices by a computer controlled by one or more application programs.

BACKGROUND OF THE INVENTION

Many currently available consumer electronic products provide a user with the ability for remote control operation using a hand-held remote control device. These remote control devices typically employ a key pad, appropriate built-in control circuits, an infrared transmitter, and battery power.

There are three major problems with the current state of technology. First, since each electronic product is supplied with its own remote control device, there has become a proliferation of these devices in each household. It is not uncommon to find three or more remote control devices in a household having one or more televisions, VCRs, CD players, a stereo system, a camcorder, etc. Manufacturers of remote control devices have attempted to address the problem by designing and marketing "universal remote control devices," allowing one remote control device to control a variety of consumer electronic products. The use of the universal remote control device does not fully solve the problem, since a second major problem, the variety and complexity of control sequences for remote control devices used by various manufacturers limits the flexibility of the so-called universal remote control devices.

For simple operations, such as changing a channel on a television receiver, the universal remote control device is adequate. However, most consumer electronic devices provide much more sophisticated capabilities for which the universal remote control device is not adequate. For example, VCR programming is a task which is very complex and is not understood by many VCR owners due to the complexity and lack of uniform programming technique standards. Further, multiple disc CD players can be programmed to play a medley of selections in any order, but few owners master the complex programming sequences.

In the past, attempts have been made by manufacturers of remote control devices to utilize the power of the home computer to assist a user in these complex programming tasks. For example, hand-held remote control devices which have an interface which can attach to a home computer, such as by a serial communications port, are available. Such devices are relatively expensive and have programming sequences "hard wired" into the logic circuitry of the device, making them inflexible and non-extendable. Such characteristics are not desirable in a fast moving consumer product environment.

The third major problem continues to be a user interface that is complex and non-standard across a variety of programmable devices currently available. The control panels and visual displays of these devices are very cost limited, resulting in highly compromised and often marginally usable human machine interfaces.

PRIOR ART

In the prior art there are many techniques for remote control of consumer electronics products. Examples of such prior art techniques are the following:

Infrared remote control devices supplied by the manufacturer of the consumer electronics product and preprogrammed with control sequences by the manufacturer.

Wireless radio frequency transmission and reception devices which allow remote control of consumer electronic devices throughout a building and without the need for direct line of sight between a remote control device and the consumer electronic product being controlled.

So-called universal remote control devices which purport to provide control signals for all functions available for remote control in a consumer electronics product. However, such "universal remote control devices" generally do not, in fact, provide control of all the capabilities of the consumer electronic device to be controlled.

SUMMARY OF THE INVENTION

Therefore, it is an object of the present invention to efficiently control consumer electronic products capable of wireless remote control by an inexpensive attachment to a home computer.

Accordingly, method and apparatus for remote control of electronic devices includes one or more processing units, a memory system, one or more I/O controllers, controlling various input/output devices such as a keyboard, a mouse, a display device, communications adapters and the like, a bus which connects the processing units, the memory system, and the I/O controllers, one or more transducers adapted to convert electronic signals to wireless communications signals and one or more application programs executable by the processor units for controlling generation and transmission of wireless communications signals for remote control of one or more electronic devices.

It is an advantage of the present invention that consumer electronic products may be efficiently, inexpensively, and precisely controlled by a remote control attachment to a home computer which can control all consumer electronic products in a household with the capability for simple upgrade as new devices or capabilities become available under the control of application software.

Other features and advantages of the present invention will become apparent in the following detailed description of the preferred embodiment of the invention taken in conjunction with the accompanying drawing.

DETAILED DESCRIPTION OF A PREFERRED EMBODIMENT OF THE INVENTION

Figure 1:
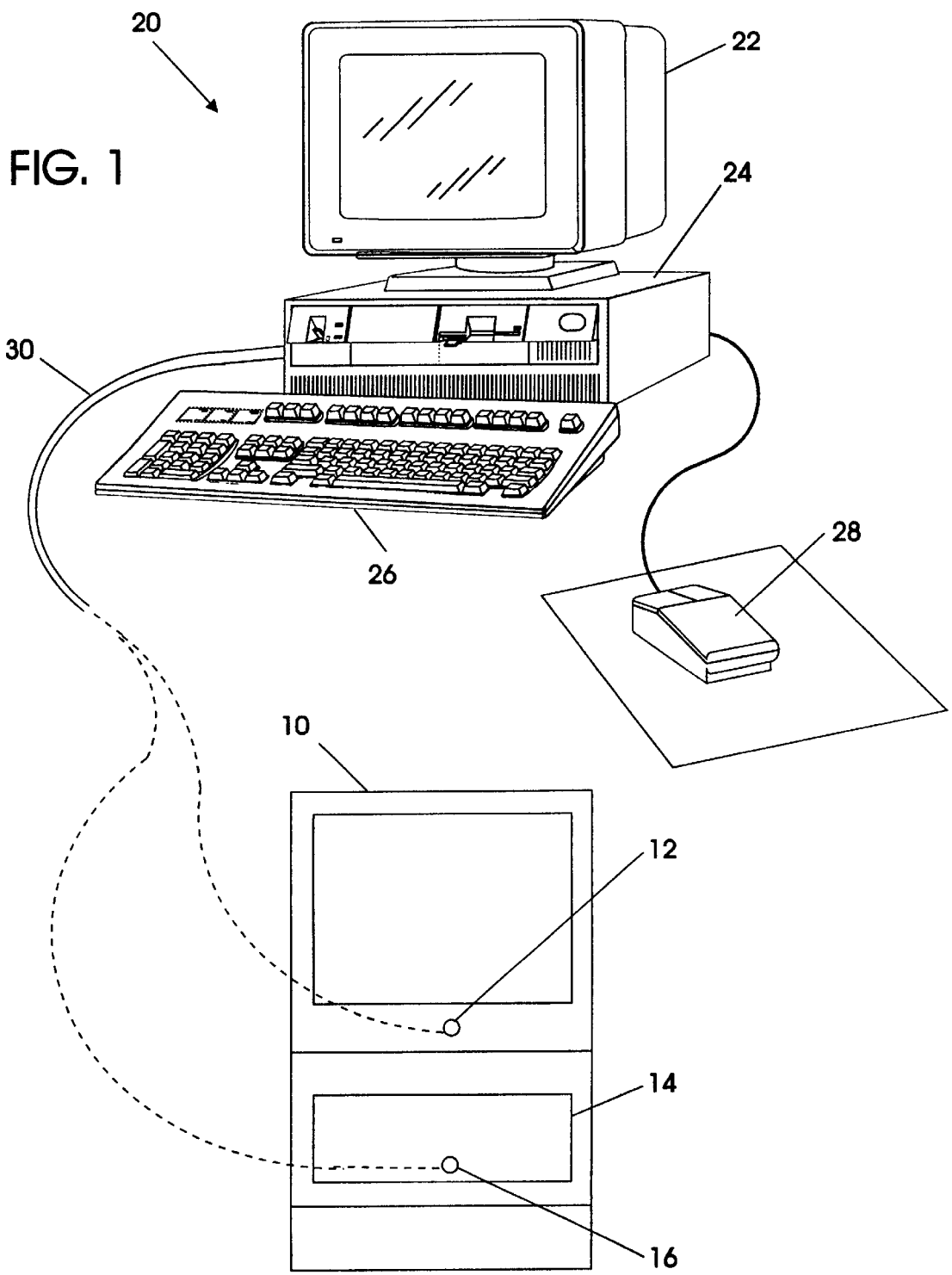
FIG. 1 is a pictorial view of a home entertainment system including consumer electronic products and control apparatus in accordance with the present invention.

Referring now to FIG. 1, a home entertainment system includes a remotely controllable consumer electronics device such as television receiving set 10 having an infrared receiving port 12 and video cassette recorder (VCR) 14 having an infrared receiving port 16. These devices receive infrared wireless remote control signals from home computer 20.

Home computer 20 includes a display monitor 22, a system unit 24, a keyboard 26, and a cursor control device such as mouse 28. Also included in home computer 20 as part of the preferred embodiment of the present invention is an aimable infrared transmitting attachment 30 which may be implemented either as an light emitting diode (LED) in a suitable enclosure connected to system unit 24 by appropriate wire connections or perhaps a fiber optic transmission means which receives transmitted infrared signals from an LED packaged within system unit 24 and which fiber optic transmission means is aimable at the infrared receiving ports 12 and 16 in consumer electronic devices 10 and 14, respectively.

It should be understood that there are many configurations of devices for conducting the infrared light from the computer controlled LED transmitter to a point which is in the line of sight of the infrared receiving ports on the consumer electronic devices 10 and 14, respectively.

It should also be understood that the consumer electronic devices 10 and 14 and the home computer 20 are well known in the art and will not be described in detail further herein except for those portions of the transmitting apparatus which enable the preferred embodiment of the present invention.

Figure 2:
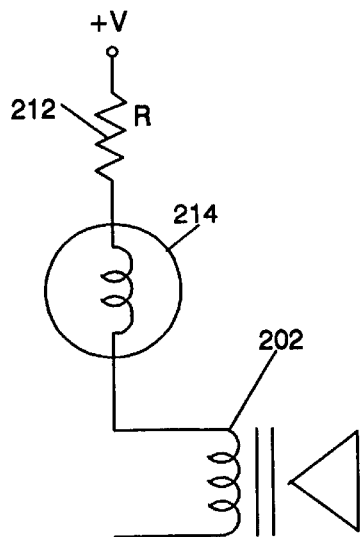
FIG. 2 is a circuit diagram of a remote control transmitter device incorporated in a speaker circuit of a home computer.

Referring now to FIG. 2, a circuit diagram of an implementation of an LED infrared transmitter as part of the audio output circuit of the home computer 20 will be described. Audio output device, speaker 202 has one lead thereof connected to a collector of control transistor 204 which may have an emitter connected to ground or other appropriate voltage. The base 208 of transistor 204 is connected to an appropriate control signal which will be described with reference to FIGS. 3 and 4.

A second lead of speaker 202 is connected in a series configuration with infrared LED 214, resistor 212, and voltage source +V. As control signals are received at the base 208 of transistor 204, current passes through LED 214, resulting in infrared pulses being generated from LED 214 in accordance with the control signals for the purpose of providing remote control input to the consumer electronics devices 10 and 14.

Since remote control signal generation requires only the addition of a single resistor and a single diode in terms of hardware, the system is very low cost as well as extremely flexible and extendable, allowing it to perform complex control tasks beyond the capability of typical users and allowing it to evolve along with evolving consumer electronic products.

Using the method and apparatus according to the present invention, a user can program the recording of any complex series of events through a single drag-and-drop operation in an OS/2 system environment on a home computer. For example, a program to be recorded on a VCR device may be represented as icons in an OS/2 graphical user interface system environment on the home computer display screen. The program icon may represent a single event such as a network program or movie, a multiple segment series, or an ongoing serial, such as a soap opera. The source of the program icons may be any conventional programming guide such as a CD-ROM containing a television guide, a subscription via some information services supplier, or even information available through the VCR Plus service.

The VCR icon may be supplied by a VCR manufacturer or other party specializing in remote control software as described herein. The VCR icon employs software control routines in accordance with the present invention. These routines implement the particular infrared programming sequences used by a particular model of VCR or other programmable device with which the icon is associated.

A universal VCR icon might be supplied, in which case the configurations of a number of programmable devices are specified, allowing users to choose or configure specific devices of their choice. It should be understood that a variety of programmable devices may be programmed in a similar manner and that additional views of any of the devices are possible. For example, in addition to the icon view of a VCR device, a view depicting the front panel controls of the VCR might be provided. This allows a user to manually control the VCR by clicking on the various display representations of VCR control buttons, using a pointing device such as a mouse, to control play, stop, pause, fast forward, rewind, or other functions.

Programming sequences implemented in accordance with the present invention for each device include:

(a) A base carrier frequency (such as 40 kHz);
(b) The appropriate pulse sequences and timing for each different control signal (such as two one-millisecond pulses for channel up); and
(c) The specific sequences of control signals required for programming various functions, such as selecting a program number, start time, duration, and channel to program a VCR for recording.

It should be understood that other hardware configurations may be used in accordance with the present invention, such as the use of a computer serial port, parallel port, or an adapter card. In each case, the application software serves essentially the same purpose, to modulate the infrared diode at the correct frequency, using the appropriate pulse codes and programming sequences for the device being controlled.

Figure 3:
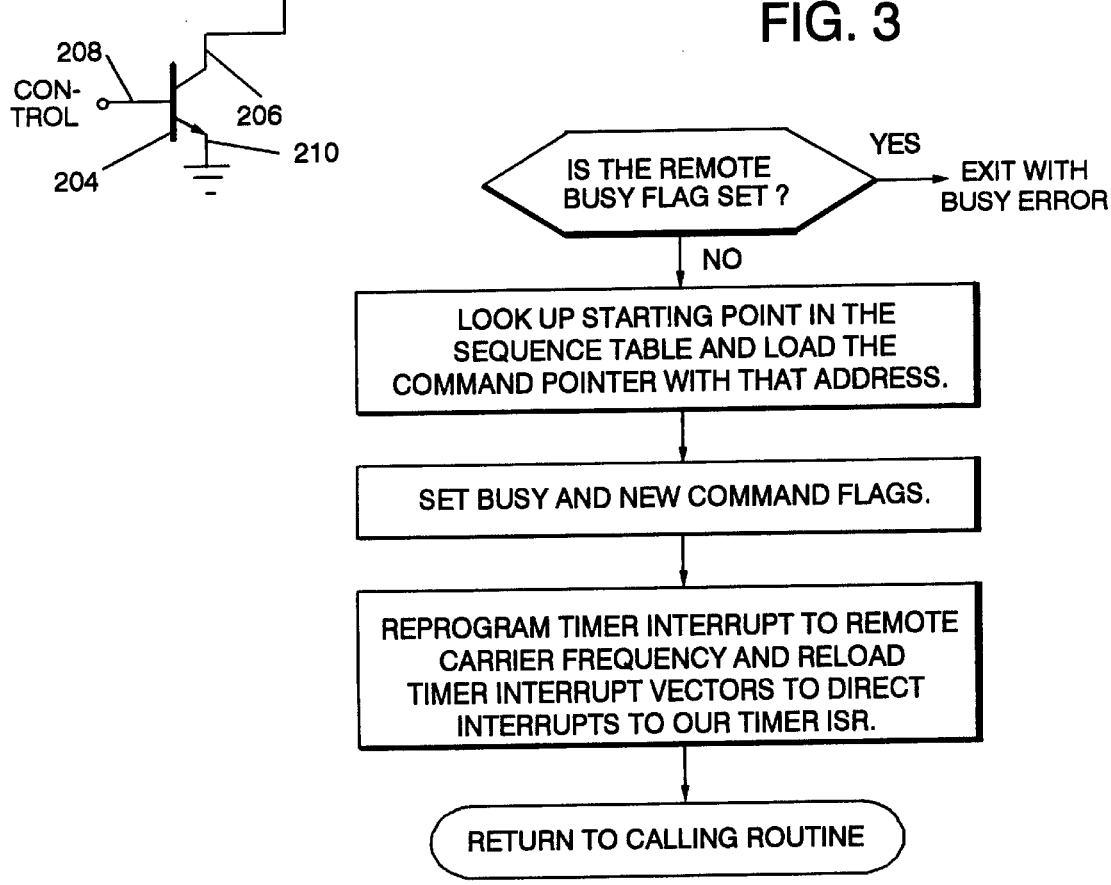
FIG. 3 is a flow chart of a remote application programming interface program in accordance with the present invention.
Figure 4:
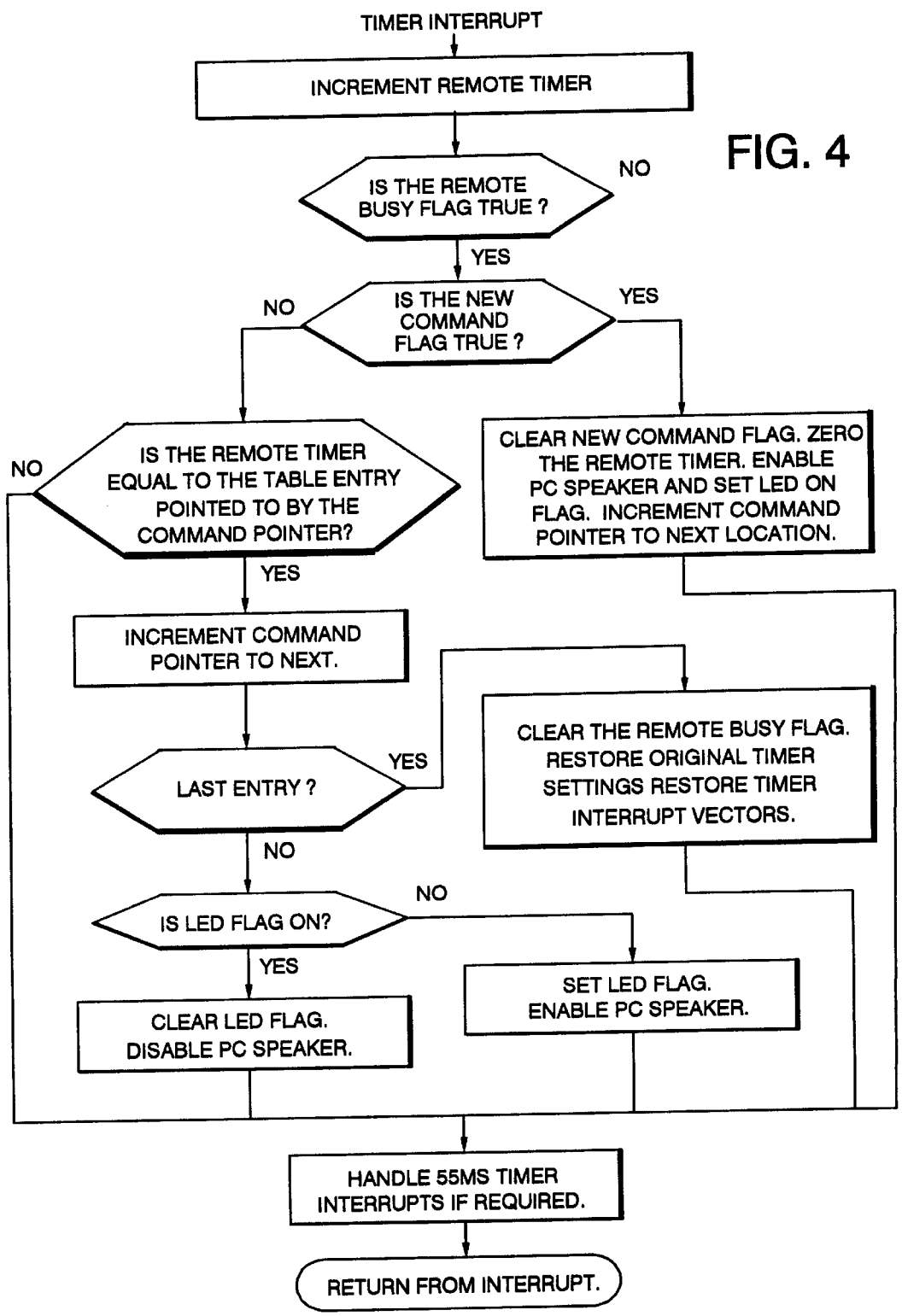
FIG. 4 is a flow chart for a remote logic timer interrupt routine in accordance with a preferred embodiment of the present invention.

The control of the infrared transmitting diode in accordance with the present invention will be described with reference to FIGS. 3 and 4.

A typical infrared control signal provides a sequence of variable width pulses operating at a carrier frequency of approximately 40 kHz with pulse duration of approximately one millisecond and spacing of about one millisecond. The signals are repeatedly transmitted while a button is depressed. The duration and spacing of the transmitted pulses is different for each function.

A control program is installed as a device driver or as a terminate and stay resident program in the computer memory. This control program modifies a software interrupt vector so that the interrupt will cause execution of a routine in the installed program. This program also includes a set of command tables which describe the infrared light timings for each remote control function required.

When active, the control program must also continue to operate the computer's real time clock software. This is done by counting timer interrupts and calling the original timer vector at an appropriate interval, such as each 55 milliseconds.

The following flags and variables are used by the software:

REMOTE BUSY True when a remote control command is being transmitted

REMOTE TIMER A counter used to time the command sequence. A typical timer may operate at 10 kHz.

COMMAND PTR A pointer into a table of on/off times for the selected command sequence.

LED ON A flag indicating that the speaker circuit is enabled to drive the LED.

55 MS TIMER A counter used to determine when the original timer software in the home computer must be called to avoid loss of real time functions.

The application programming interface will now be described with reference to FIG. 3.

The calling routine enters the API routine and tests for remote busy flag set. If true, a busy exit is taken.

If not set, a starting point in the sequence table is looked up, and the command pointer is loaded with the starting point address.

Next, the busy and new command flags are set, and then the timer interrupt is reprogrammed to remote carrier frequency, and the timer interrupt vectors are reloaded to direct interrupts to the timer interrupt routine. Control is then returned to the calling routine.

The timer interrupt routine embodied in the preferred embodiment of the present invention will be described with reference to FIG. 4.

The routine is called at 0.1 millisecond intervals by a hardware timer in the home computer. When the routine is called, the remote timer is incremented. If the remote busy flag is true, a test is made to determine if the new command flag is true.

If the new command flag is true, the new command flag is cleared, the remote timer is zeroed, the PC speaker is enabled, and the LED on flag is set, and the command pointer is set to the next location.

If the new command flag is false, a test is made to determine if the remote timer is equal to the table entry pointed to by the command pointer. If not, the routine goes immediately to handling other timer interrupts and exiting the routine.

If true, the command pointer is incremented to the next address, a test is made to determine if a last entry, if not a last entry a test is made to determine if the LED flag is on. If the LED flag is not on, the LED flag is set, and the PC speaker is enabled.

If the LED flag is on, the LED flag is cleared, and the PC speaker is disabled, and the routine is then exited, again handling other interrupts as required.

If a last entry is detected, the remote busy flag is cleared, the original timer settings are restored, and the timer interrupt vectors are restored.

Apparatus and method according to the present invention allow total and extendable control of consumer electronics devices through the use of a point-and-click or drag-and-drop operation in a graphical user interface environment on a home computer.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. Apparatus, for remote control of electronic devices, comprising:
   one or more processing units;
   a memory system;
   one or more I/O controllers;
   a bus connecting the processing units, the memory system, and the I/O controllers;
   one or more transducers, adapted to convert electronic control signals to wireless communications signals;
   one or more application programs executable by said one or more processing units for controlling generation and transmission of wireless communications signals for remote control of one or more electronic devices; and
   one or more tables associated with each application program, wherein each table contains data used by the associated application program for generation of the electronic control signals which are converted by the one or more transducers to wireless communications signals.

2. Apparatus, according to claim 1, wherein the I/O controllers comprise means for controlling input/output devices.

3. Apparatus, according to claim 1, wherein the one or more transducers comprise:
   at least one infrared emitting device.

4. Apparatus, according to claim 1, wherein the one or more transducers comprise:
   at least one wireless radio frequency transmitting device.

5. Apparatus, according to claim 1, wherein the one or more transducers comprise:
   at least one infrared emitting device; and
   at least one wireless radio frequency transmitting device.

6. Apparatus, according to claim 1, further comprising means for conducting the wireless communication signals from the transducer to a point in direct line of sight of a detector in an electronic device subject to remote control.

7. Apparatus, according to claim 1, wherein the data used by the associated application program comprises:
   pulse sequence and timing data necessary for generation of electronic signals for each of the one or more electronic devices.

8. A method of generating wireless communications signals, comprising the steps of:
   setting a command pointer to a starting command in a table, wherein said table is comprised of one or more commands;
   programming a timer interrupt to a remote carrier frequency; and
   passing control to a timer interrupt routine at specified time intervals, wherein the timer interrupt routine performs the steps of:
   reading a command from the table;
   determining, based on the command, if a state of a transmission signal should be changed; and
   changing the state of the transmission signal if it is determined during said determining step that the state of the transmission signal should be changed.

9. A method of generating wireless communications signals according to claim 8, wherein said determining step comprises the steps of:
   incrementing a remote timer; and
   determining if the remote timer is equal to a value pointed to by the command pointer.

10. A method of generating wireless communications signals according to claim 8, further comprising the step of testing a busy flag to determine if a wireless communications signal is currently being transmitted.

11. A method of generating wireless communications signals according to claim 8, wherein the commands in the command table comprise pulse sequence and timing data necessary for generation of electronic signals to be converted by one or more transducers to the wireless communications signals.

12. A method of generating wireless communications signals according to claim 8, wherein said changing step comprises the steps of:

changing a state of an LED flag; and changing a state of a speaker.

13. A method of generating wireless communications signals according to claim 8, wherein said changing step comprises the steps of:

clearing an LED flag; and disabling a speaker.

14. A method of generating wireless communications signals according to claim 8, wherein said changing step comprises the steps of:

setting an LED flag; and enabling a speaker.

* * * * *